United States Patent
Nagarajegowda et al.

(10) Patent No.: US 11,743,287 B2
(45) Date of Patent: Aug. 29, 2023

(54) DENIAL-OF-SERVICE DETECTION SYSTEM

(71) Applicant: Dell Products L.P., Round Rock, TX (US)

(72) Inventors: Deepak Nagarajegowda, Cary, NC (US); Bina Thakkar, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 324 days.

(21) Appl. No.: 16/986,427

(22) Filed: Aug. 6, 2020

(65) Prior Publication Data
US 2022/0046054 A1    Feb. 10, 2022

(51) Int. Cl.
*G06F 21/51*    (2013.01)
*H04L 29/06*    (2006.01)
(Continued)

(52) U.S. Cl.
CPC .......... *H04L 63/1458* (2013.01); *G06N 5/04* (2013.01); *G06N 20/00* (2019.01); *H04L 63/1425* (2013.01); *H04L 2463/142* (2013.01)

(58) Field of Classification Search
CPC ............ H04L 63/1458; H04L 63/1425; H04L 2463/142; G06N 5/04; G06N 20/00
See application file for complete search history.

(56) References Cited

U.S. PATENT DOCUMENTS

2010/0082513 A1* 4/2010 Liu .................. G06N 3/006
                                                        706/46
2017/0010931 A1* 1/2017 Agarwal ............ G06F 11/0787
(Continued)

FOREIGN PATENT DOCUMENTS

WO    WO-2021137182 A1 *  7/2021 ......... H04L 63/1416

OTHER PUBLICATIONS

Azuan Ahmad; Wan Shafiuddin Zainudin; Mohd Nazri Kama; Norbik Bashah Idris; Madihah Mohd Saudi; "Cloud Co-Residency Denial of Service Threat Detection Inspired by Artificial Immune System"; Proceedings of the 2018 Artificial Intelligence and Cloud Computing Conference; Dec. 2018, pp. 76-82 (Year: 2018).*

(Continued)

*Primary Examiner* — Mohammad W Reza
*Assistant Examiner* — Courtney D Fields
(74) *Attorney, Agent, or Firm* — Joseph Mencher (57) ABSTRACT

A denial-of-service detection system includes a denial-of-service detection subsystem coupled to a plurality of storage systems via a network. The denial-of-service detection subsystem receives current first storage system data for each of a plurality of different storage system operating metrics from a first storage system included in the plurality of storage systems. Based on a historical storage system data for each of the plurality of different storage system operating metrics that was previously received from the plurality of storage devices, the denial-of-service subsystem detects an operating anomaly in the current first storage system data for at least one of the plurality of different storage system operating metrics, identifies a time-series similarity in a subset of respective time-series of the current first storage system data for each of the plurality of different storage system operating metrics for which the operating anomaly was detected and, in response, performs a denial-of-service remediation action.

20 Claims, 9 Drawing Sheets

(51) Int. Cl.
H04L 9/40 (2022.01)
G06N 5/04 (2023.01)
G06N 20/00 (2019.01)

(56) References Cited

U.S. PATENT DOCUMENTS

2020/0387797 A1* 12/2020 Ryan .................... G06N 3/084
2022/0046046 A1*  2/2022 Rao ..................... G06F 21/577

OTHER PUBLICATIONS

CISA "Understanding Denial-of-Service Attacks," Security Tip (ST04-015), Original Release Date: Nov. 4, 2009 | Last Revised: Nov. 20, 2019, 3 pages, https://www.us-cert.gov/ncas/tips/ST04-015, Printed: Aug. 5, 2020.

NIST "SC-5 Denial of Service Protection," NVD—Control—SC-5 Denial of Service Protection, NIST Special Publication 800-53 (Rev.4), Security and Privacy Controls for Federal Information Systems and Organizations, 6 pages, https://nvd.nist.gov/800-53/Rev4/control/SC-5, Printed: Aug. 5, 2020.

Hasan et al. "Toward a Threat Model for Storage Systems," ResearchGate, 10 pages, Content Uploaded by William Yurcik on May 30, 2014, https://www.researchgate.net/publication/221103837_Toward_a_threat_model_for_storage_systems, Printed: Aug. 5, 2020.

Marsella, Jon, "The Details Behind a Denial of Service Attack: What It Is, Why It Matters and What You Can Do to Stop It," 5 pages, BigCommerce, Copyright 2003-2020 BigCommerce Pty. Ltd., https://www.bigcemmerce.com/blog/denial-of-service-attack/#ddos-attacks-some-recent-statistics, Printed: Aug. 5, 2020.

Shostack, Adam "Stride Chart," Microsoft Security, Sep. 11, 2007, 2 pages, https//www.microsoft.com/security/blog/2007/09/11/stride-chart/, Printed: Aug. 5, 2020.

Verizon, "Results and Analysis," 2019 DBIR Results & Analysis | Verizon Enterprise Solutions, 18 pages, https://enterprise.verizon.com/resources/reports/dbir/2019/results-and-analysis/, Printed: Aug. 5, 2020.

Rayome, Alison DeNisco, "Major DDoS Attacks Increased 967% this Year," TechRepublic, 2 pages, Apr. 24, 2019, 6:00AM PST, https://www.techrepublic.com/article/major-ddos-attacks-increased-967-this-year/, Printed: Aug. 5, 2020..

* cited by examiner

DENIAL-OF-SERVICE DETECTION SYSTEM

BACKGROUND

The present disclosure relates generally to information handling systems, and more particularly to detecting a denial-of-service situation in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometimes experience denial-of-service situations that can impact the availability of the information handling systems, its devices, and/or its network resources. As would be appreciated by one of skill in the art in possession of the present disclosure, denial-of-service situations may occur an information handling system is "attacked" or otherwise inundated with fake requests by a denial-of-service attacker that can result in a slowdown and/or inoperability of the information handling system due to its inability to handle the large number of requests, and results in legitimate users of the information handling system experiencing significantly longer response times (relative to situations where no denial-of-service attack is happening), and/or an inability to receive any response from the information handling system. Furthermore, such denial-of-service attacks can expose vulnerabilities in the information handling system that can make it prone to other malicious threats and attacks. Denial-of-service attacks have increased in sophistication in recent years, with relatively large distributed-denial-of-service attacks (e.g., having a size greater than 100 Gbps) increasing by almost 1000% in the first quarter of 2019 (relatively to the first quarter of 2018), and the largest denial-of-service attack in 2019 having a size of almost 600 Gbps (an increase of 70% from the largest attack in 2018).

While denial-of-service attacks originally required significant technical/security knowledge of different information handling systems, their devices, and their network resources, today denial-of-service infrastructure and denial-of-service programs are easily available, and allow denial-of-service attackers to relatively easily overcome the technical/security barriers in launching denial-of-service attacks. Current solutions that attempt to address denial-of-service attacks include static rule-based solutions that enforce static rules when a threshold is reached or traffic is received on particular ports, statistical anomaly-based solutions that attempt to detect anomalies in data traffic, and stateful protocol analysis solutions that use stateful protocol features (e.g., Transmission Control Protocol (TCP) request/response features) to detect denial-of-service attacks. Furthermore, current traffic handling techniques for dealing with denial-of-service attacks include Internet Protocol (IP) traffic analysis and filtering for IP-based prevention that utilizes IP traffic characteristics to detect denial-of-service attacks, traffic sink holing techniques that utilize "honeypot" devices to attract and detect denial-of-service attacks, and the leveraging of security features of firewalls, routers, and switches at the edge of a network to detect denial-of-service attacks. However, each of these solutions are geared to the application layer and thus have difficulties detecting denial-of-service attacks directed to storage systems, while also requiring countermeasures that many less technical users may not have the expertise to implement, and tend to be relatively costly.

Accordingly, it would be desirable to provide a denial-of-service detection system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a denial-of-service detection engine that is configured to: receive, from a first storage system that is included in a plurality of storage systems, current first storage system data for each of a plurality of different storage system operating metrics; detect, based on a historical storage system data for each of the plurality of different storage system operating metrics that was previously received from the plurality of storage devices, an operating anomaly in the current first storage system data for at least one of the plurality of different storage system operating metrics; identify, in response to detecting the operating anomaly in the current first storage system data for the at least one of the plurality of different storage system operating metrics, a time-series similarity in a subset of respective time-series of the current first storage system data for each of the plurality of different storage system operating metrics for which the operating anomaly was detected; and perform, in response to identifying the time-series similarity in the subset of respective time-series of the current first storage system data for each of the plurality of different storage system operating metrics for which the operating anomaly was detected, a denial-of-service remediation action.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
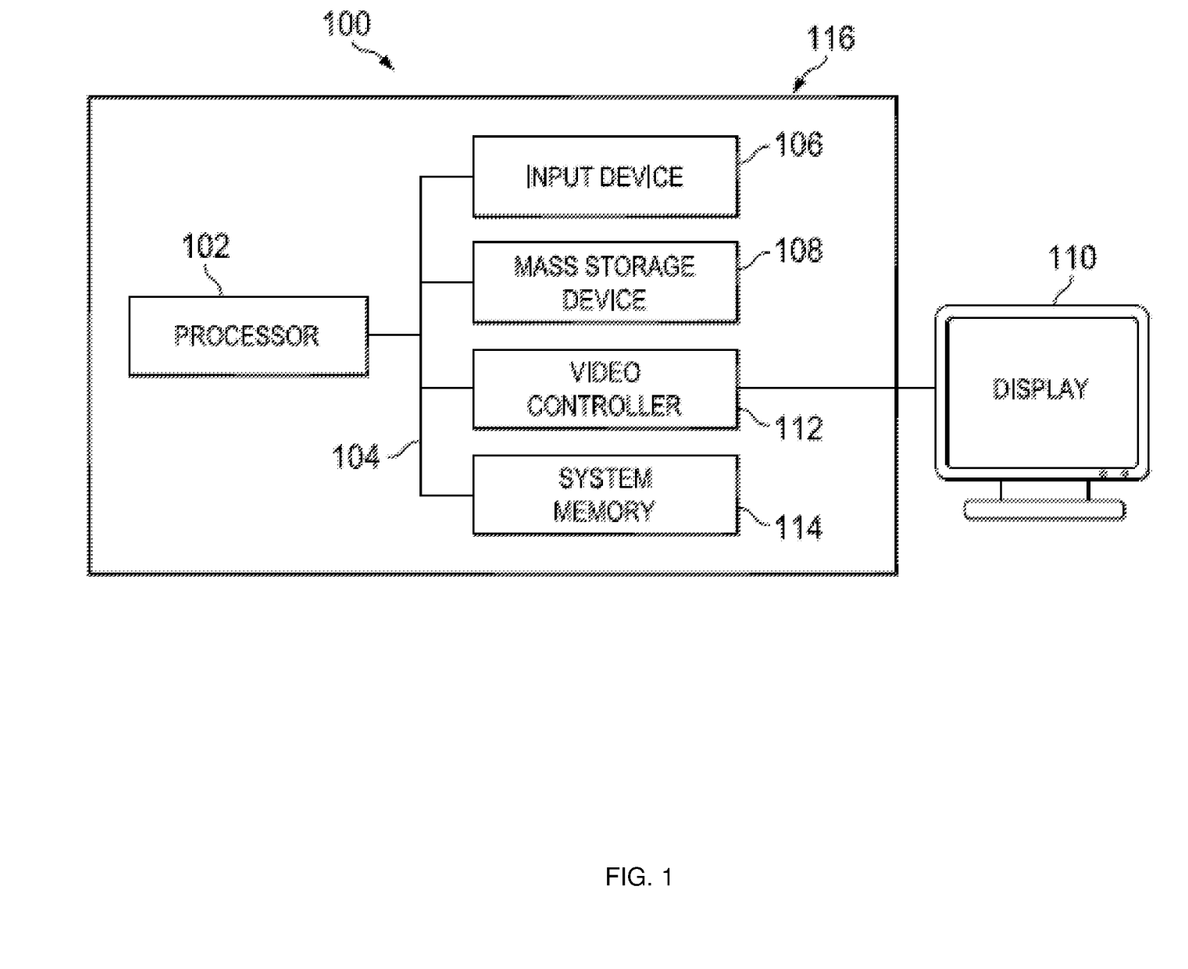
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
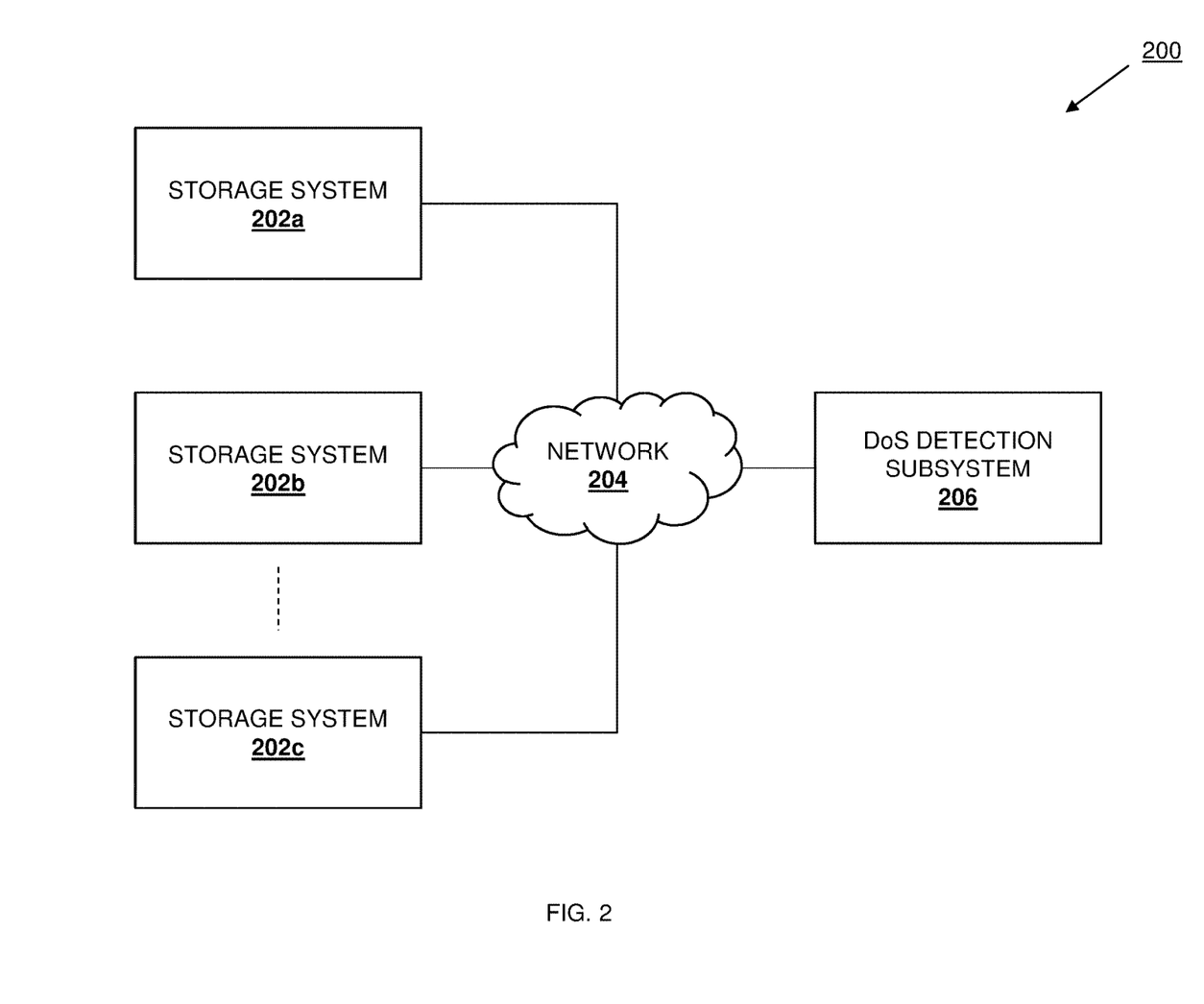
FIG. 2 is a schematic view illustrating an embodiment of a networked system that may utilize the denial-of-service detection system of the present disclosure.

Referring now to FIG. 2, an embodiment of a denial-of-service detection system 200 is illustrated. In the illustrated embodiment, the denial-of-service detection system 200 includes a plurality of storage systems 202a, 202b, and up to 202c. In an embodiment, any or all of the storage systems 202a-202c may be provided by the IHS 100 discussed above with reference to FIG. 1, and/or may include some or all of the components of the IHS 100, and in specific examples may be storage systems that include a variety of storage devices, and that may be located at a plurality of different user/customer sites such that each storage system operates as a separate storage system entity managed by a separate user/customer. However, while illustrated and discussed below as being provided by storage systems controlled by different entities, one of skill in the art in possession of the present disclosure will recognize that devices and systems provided in the denial-of-service detection system 200 may include any storage systems/storage devices that may be configured to operate similarly as the storage systems 202a-202c discussed below, and may be controlled by any entit(ies) while remaining within the scope of the present disclosure as well.

In the illustrated embodiment, each of the storage systems 202a-202c are coupled to a network 204 that may be provided by a Local Area Network (LAN), the Internet, combinations thereof, and/or any other network that would be apparent to one of skill in the art in possession of the present disclosure. Furthermore, a denial-of-service (DoS) detection subsystem 206 is coupled to each of the storage systems 202a-202c via the network 204, and the denial-of-service detection subsystem 206 may be provided by the IHS 100 discussed above with reference to FIG. 1 and/or may include some or all of the components of the IHS 100, and in specific examples may include one or more server computing devices that are configured to perform the denial-of-service functionality discussed in further detail below. While not illustrated in FIG. 2, as discussed below, one of skill in the art in possession of the present disclosure will recognize that other devices may be coupled to the storage system(s) 202a, 202b, and/or 202c via the network 204 in order to, for example, perform the denial-of-service attack operations that result in the denial-of-service situations discussed in further detail below. However, while a specific denial-of-service detection system 200 has been illustrated and described, one of skill in the art in possession of the present disclosure will recognize that the denial-of-service detection system of the present disclosure may include a variety of components and component configurations while remaining within the scope of the present disclosure as well.

Figure 3:
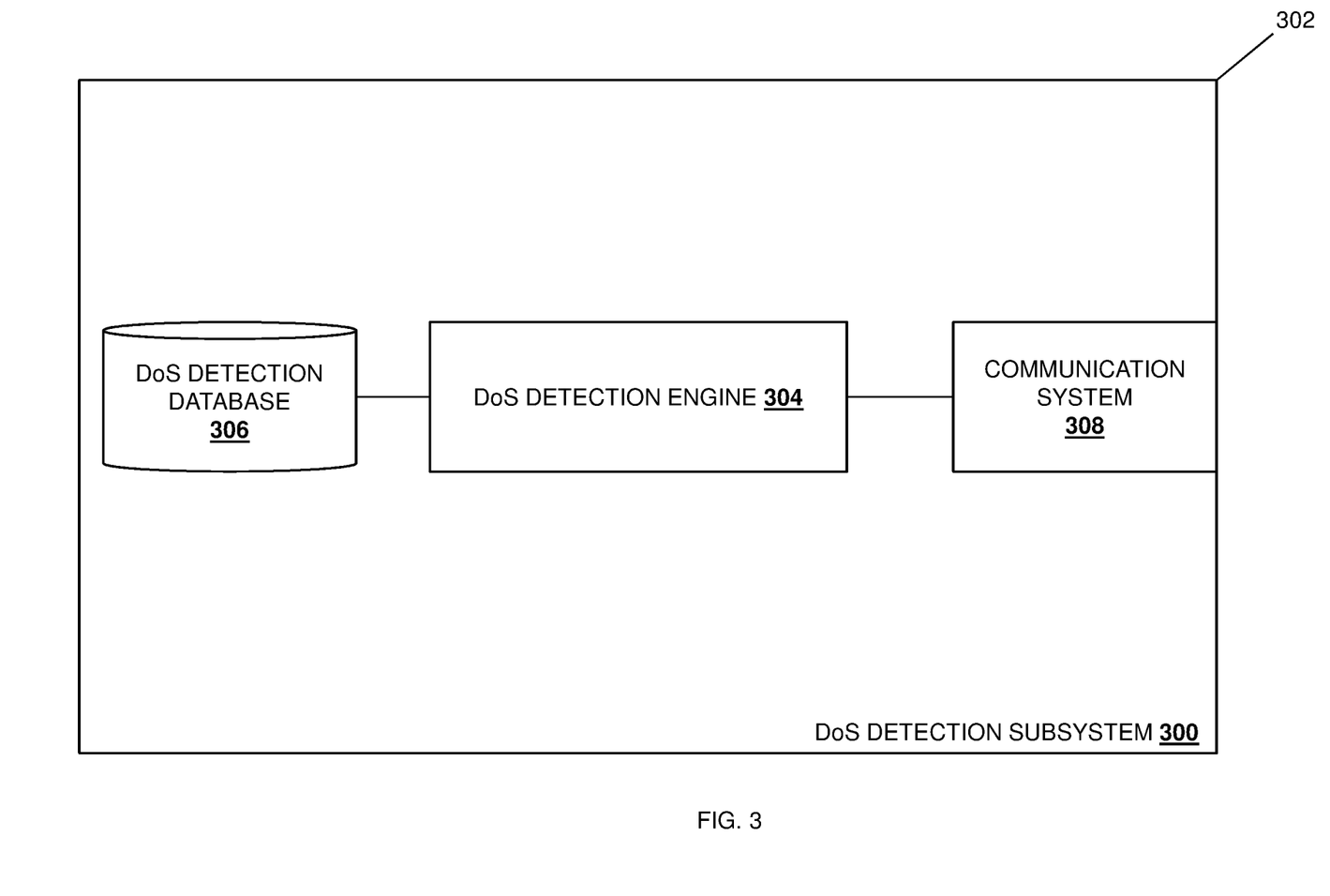
FIG. 3 is a schematic view illustrating an embodiment of a denial-of-service detection system that may be provided in the networked system of FIG. 2.

Referring now to FIG. 3, an embodiment of a denial-of-service detection subsystem 300 is illustrated that may provide the denial-of-service detection subsystem 206 discussed above with reference to FIG. 2. As such, the denial-of-service detection subsystem 300 may be provided by the IHS 100 discussed above with reference to FIG. 1 and/or may include some or all of the components of the IHS 100, and in specific examples may be provided by one or more server computing devices. Furthermore, while illustrated and discussed as being provided by one or more server computing devices, one of skill in the art in possession of the present disclosure will recognize that the functionality of the denial-of-service detection subsystem 300 discussed below may be provided by other devices that are configured to operate similarly as the denial-of-service detection subsystem 300 discussed below.

In the illustrated embodiment, the denial-of-service detection subsystem 300 includes a chassis 302 that houses the components of the denial-of-service detection subsystem 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a denial-of-service detection engine 304 that is configured to perform the functionality of the denial-of-service detection engines and/or denial-of-service detection subsystems discussed below. For example, in some of the embodiments discussed below, the denial-of-service detection engine 304 includes a machine learning algorithm that is configured to generate the multi-variate anomaly detection models discussed below, a normalization sub-engine that is configured to normalize storage system data received from any storage system for use in detecting denial-of-service situations, a weighted majority sub-engine that is configured for use in detecting denial-of-service situations, and one of skill in the art in possession of the present disclosure will appreciate how the denial-of-service detection engine 304 may include a variety of other algorithms and/or sub-engines for providing the denial-of-service detection functionality discussed below.

The chassis 302 may also house a storage system (not illustrated, but which may include the storage 108 discussed above with reference to FIG. 1) that is coupled to the denial-of-service detection engine 304 (e.g., via a coupling between the storage system and the processing system) and that includes a denial-of-service detection database 306 that is configured to store any of the information utilized by the denial-of-service detection engine 304 discussed below. The chassis 302 may also house a communication system 308 that is coupled to the denial-of-service detection engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific denial-of-service detection subsystem 300 has been illustrated and described, one of skill in the art in possession of the present disclosure will recognize that denial-of-service detection subsystems (or other devices operating according to the teachings of the present disclosure in a manner similar to that described below for the denial-of-service detection subsystem 300) may include a variety of components and/or component configurations for providing conventional server computing device functionality, as well as the functionality discussed below, while remaining within the scope of the present disclosure as well.

Figure 4:
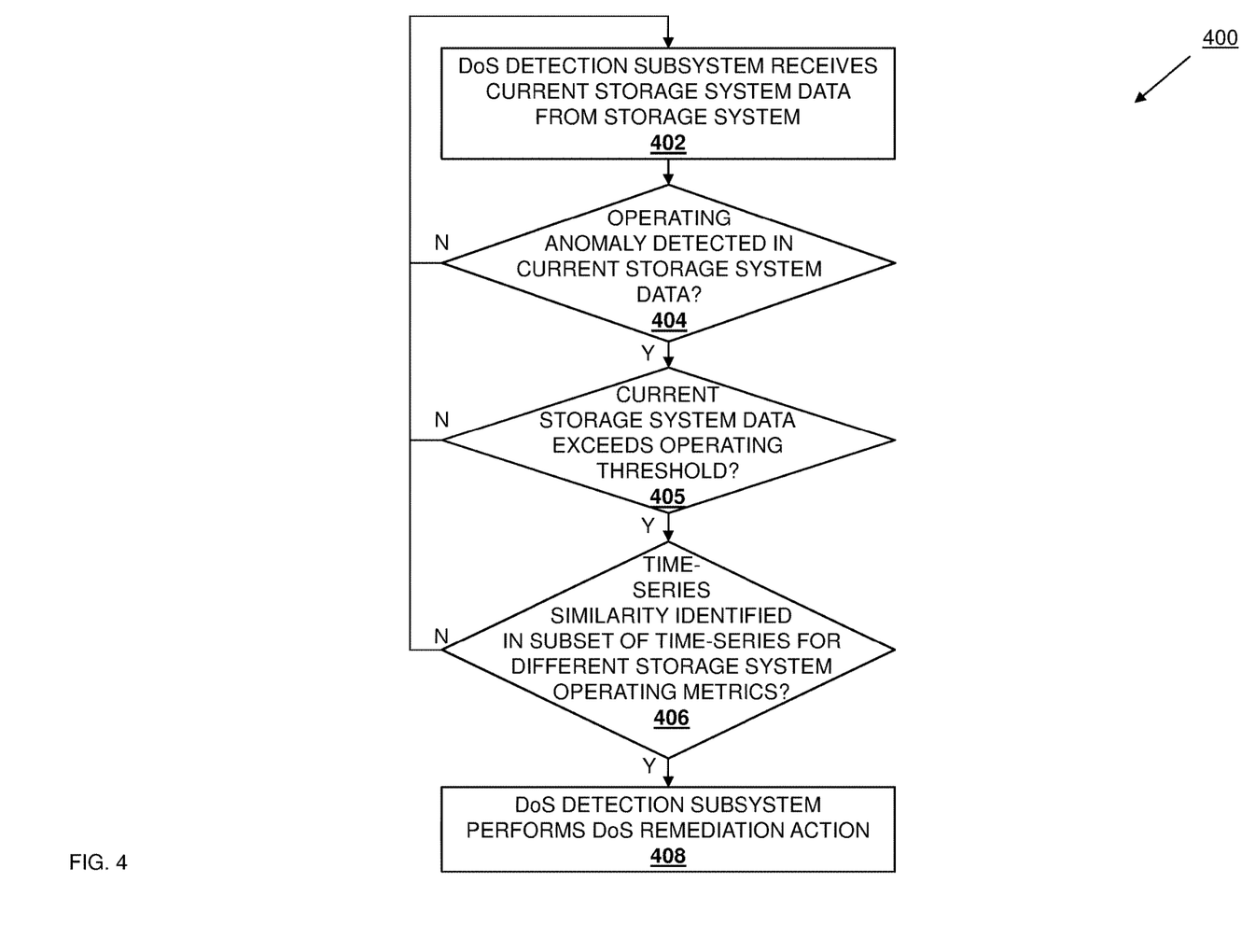
FIG. 4 is a flow chart illustrating an embodiment of a method for detecting a denial-of-service situation.

Referring now to FIG. 4, an embodiment of a method 400 for detecting a denial-of-service situation is illustrated. As discussed below, the systems and methods of the present disclosure provide a novel approach to the detection of denial-of-service situations in storage systems via the use of machine leaning algorithm(s) to create of a multi-variate anomaly detection model from historical storage system data that is received from a plurality of storage system, with the multi-variate anomaly detection model used to detect an operating anomaly in current storage system data received from a storage system. In response to the detection of an operating anomaly in such current storage system data, respective time series of the current storage system data for different operating metrics are analyzed to determine whether a time-series similarity exists for those time-series and, if so, a denial-of-service remediation action is performed. As such, the denial-of-service detection system of the present disclosure may detect operating anomalies in multiple storage system/storage object metrics and, if the time-series for those anomalous storage system/storage object metrics is similar to the time-series of those storage system/storage object metrics during denial-of-service situation(s), a denial-of-service situation is identified and a denial-of-service remediation action may be performed.

The method 400 begins at block 402 where a denial-of-service detection subsystem receives current storage system data from a storage system. In an embodiment, at block 402, the denial-of-service detection engine 304 in the denial-of-service detection subsystem 206/300 may operate to receive current storage system data through the network 204 from one of the storage systems 202a-202c via its communication system 308. In the embodiments of the method 400 discussed below, block 402 is discussed as being performed to receive current storage system data from the storage system 202a in order to detect an operating anomaly in that current storage system data. However, one of skill in the art in possession of the present disclosure will recognize how multiple previous iterations of the method 400 may have allowed the denial-of-service detection engine 304 in the denial-of-service detection subsystem 206/300 to receive historical storage system data from each of the storage systems 202a-202c during the performance of block 402, and that historical storage system data may then be used in the current iteration of the method 400 to detect an operating anomaly associated with the current storage system data received from the storage system 202a at block 402, discussed in further detail below.

Figure 5A:
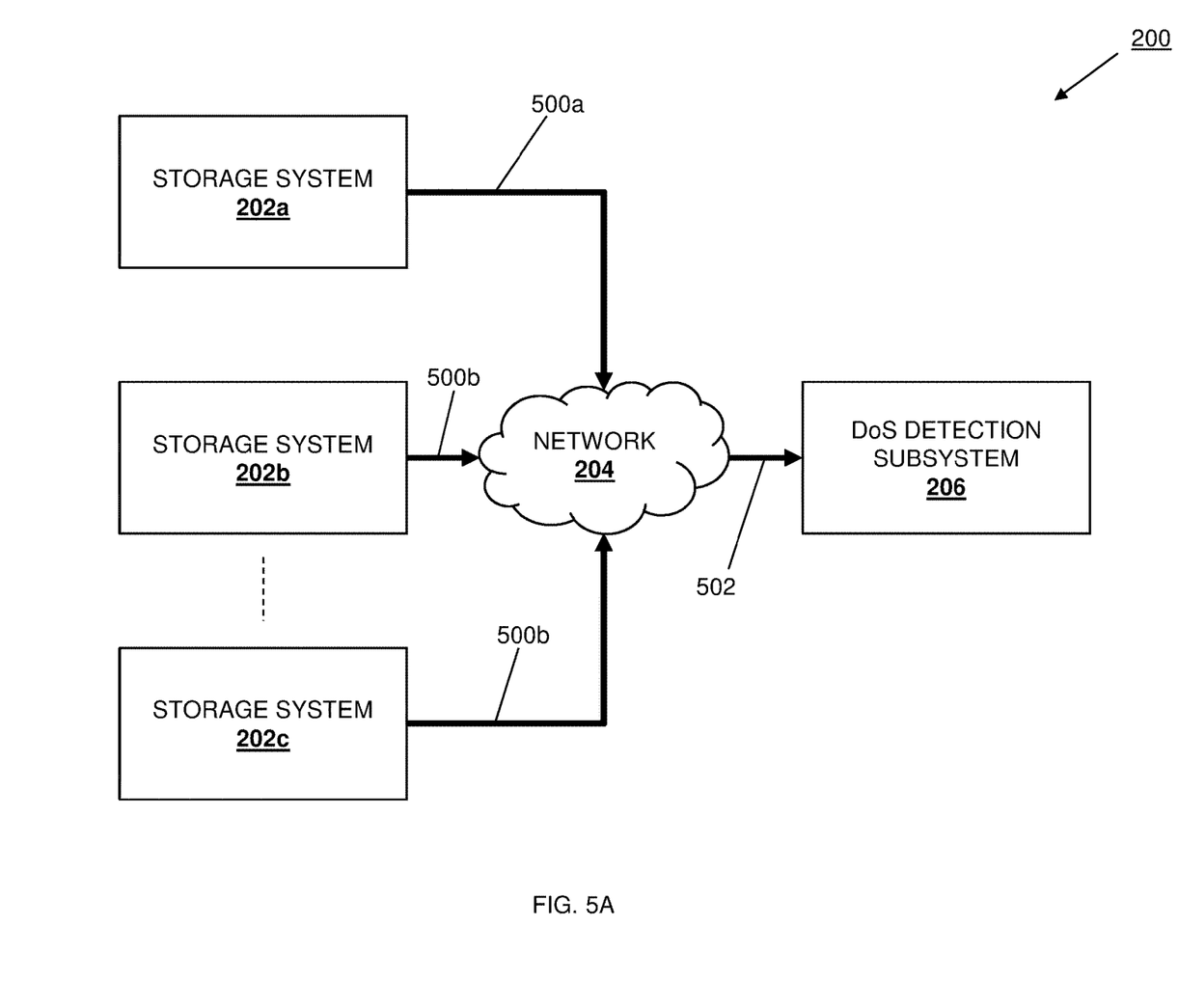
FIG. 5A is a schematic view illustrating an embodiment of the networked system of FIG. 2 operating during the method of FIG. 4.

For example, as illustrated in FIG. 5A and prior to the current iteration of the method 400 discussed below, each of the storage systems 202a, 202b, and up to 202c may operate to perform storage system data transmission operations 500a, 500b, and up to 500c, respectively, in order to generate and transmit respective storage system data associated with that storage system over the network 204 to the denial-of-service detection subsystem 206 (i.e., during one or more iterations of the method 400). In an embodiment, the storage system data transmitted by any particular storage system may include storage system data for each of a plurality of different storage system operating metrics that describe the operation of that storage system. For example, the plurality of different storage system operating metrics may include storage system performance metrics such as a processing system utilization (e.g., a Central Processing Unit (CPU) utilization) metric, a latency metric, a cache hit metric, read/write percentage metric, a storage object (e.g., a Logical Unit Number (LUN) or file system) utilization metric, and/or any other storage system performance metric that would be understood by one of skill in the art in possession of the present disclosure as describing the performance of a storage system.

In another example, the plurality of different storage system operating metrics may include storage system network metrics such as an Internet Small Computer Systems Interface (iSCSI) port bandwidth metric, an iSCSI port requests metric, a fiber channel port bandwidth metric, a fiber channel port requests metric, a fiber channel link errors metric, an Ethernet port bandwidth metric, an Ethernet packets metric, and/or any other storage system network metric that would be understood by one of skill in the art in possession of the present disclosure as describing the utilization of a network by a storage system. As will be appreciated by one of skill in the art in possession of the present disclosure, storage systems may utilize particular network technologies, and thus may only report storage system data for particular storage system network metrics associated with those particular network technologies (i.e., a fiber channel storage system may report storage system data for the fiber channel port bandwidth metric, the fiber channel port requests metric, and the fiber channel link errors metric discussed above, and not for the Ethernet port bandwidth metric and the Ethernet packets metric discussed above). However, while a few specific storage system operating metrics are described above, one of skill in the art in possession of the present disclosure will recognize that a wide variety of storage system operating methods may be reported by the storage systems 202a-202c to the denial-of-service detection subsystem while remaining within the scope of the present disclosure as well.

Figure 5B:
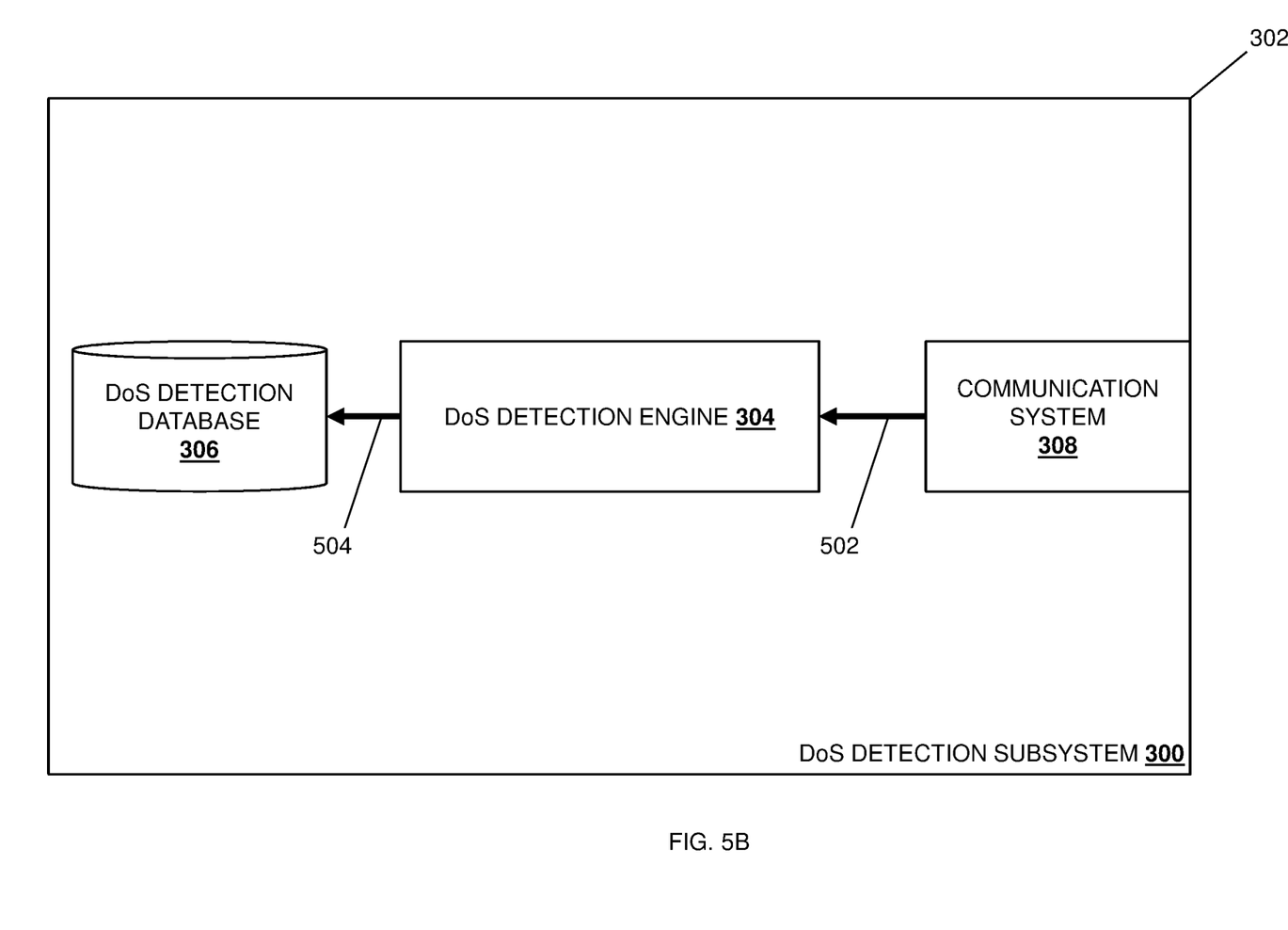
FIG. 5B is a schematic view illustrating an embodiment of the denial-of-service detection system of FIG. 3 operating during the method of FIG. 4.

As such, with reference to FIGS. 5A and 5B, the denial-of-service detection engine 304 in the denial-of-service detection subsystem 206/300 may perform storage system data receiving operations 502 in order to receive the storage system data transmitted by the storage systems 202a-202b through the network 204 and via its communication system 308. As will be appreciated by one of skill in the art in possession of the present disclosure, in some embodiment the denial-of-service detection engine 304 may perform the operations discussed below to determine if there are operating anomalies associated with the storage system data received from the storage systems 202a-202c and, subsequently, may utilize that storage system data as "historical" storage system data in a multi-variate anomaly detection model that is configured for use in detecting a denial-of-service situation (discussed in further detail below).

Thus, prior to the current iteration of the method 400, the denial-of-service detection engine 304 in the denial-of-service detection subsystem 206/300 may utilize any historical storage system data received from the storage systems 202a, 202b, and up to 202c, to generate and/or update a multi-variate anomaly detection model. For example, the denial-of-service detection engine 304 in the denial-of-service detection subsystem 206/300 may include one or more machine learning algorithms that are configured to analyze the relatively large amounts of storage system data received at regular intervals for the storage systems 202a-202c in order to build a multi-variate anomaly detection model that considers multiple variables provided by the different storage system operating metrics that are reported via the storage system data provided by each of the storage systems 202a-202c and, as illustrated in FIG. 5B, perform multi-variate anomaly detection model storage operations 504 to store that multi-variate anomaly detection model in the denial-of-service detection database 306. The inventors of the present disclosure describe techniques for generating a multi-variate anomaly detection model that may be utilized by the denial-of-service detection subsystem 206/300 in U.S. patent application Ser. No. 16/914,599, filed on Jun. 29, 2020, the disclosure of which is incorporated herein by reference in its entirety. As discussed below, the multi-variate anomaly detection model may describe values of storage system operating metrics that are indicative and/or not indicative of a denial-of-service situation, which allows the use of the multi-variate anomaly detection model to detect operating anomalies via the storage system operating metrics when a denial-of-service situation does exist in a storage system. However, while the use of a specific multi-variate anomaly detection model is described herein, one of skill in the art in possession of the present disclosure will recognize how the operating anomalies may be detected as described herein using other techniques that will fall within the scope of the present disclosure as well.

Figure 6A:
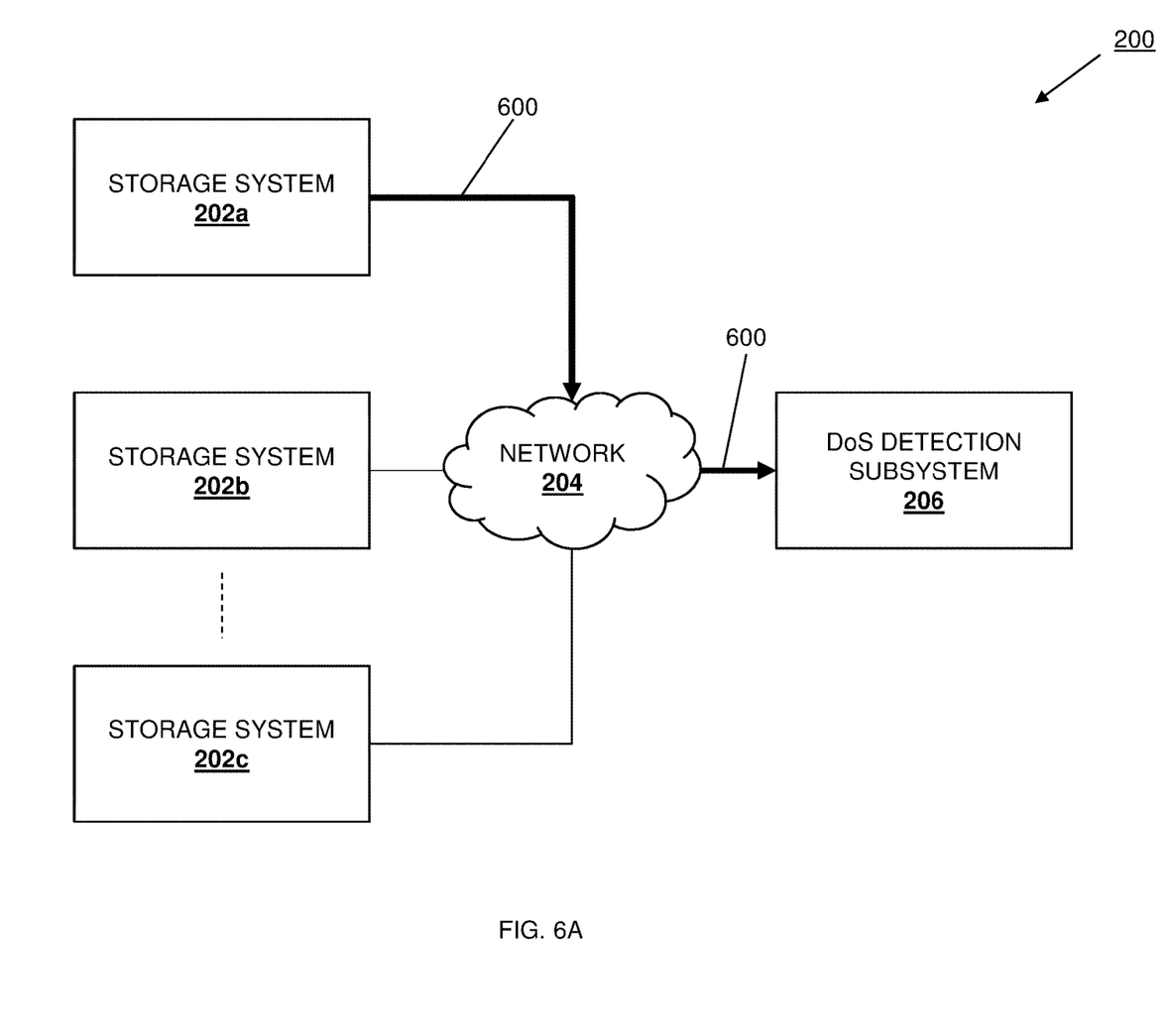
FIG. 6A is a schematic view illustrating an embodiment of the networked system of FIG. 2 operating during the method of FIG. 4.

Thus, with reference to FIG. 6A and in an embodiment of the current iteration of the method 400, at block 402 the storage system 202a may perform storage system data transmission operations 600 in order to generate and transmit current storage system data associated with the storage system 202a over the network 204 to the denial-of-service detection subsystem 206. As discussed above, the current storage system data received by the denial-of-service detection engine 304 in the denial-of-service detection subsystem 206/300 from the storage system 202a may describe current storage system performance metrics for the storage system 202a such as a current processing system utilization (e.g., a CPU utilization) metric for the storage system 202a, a current latency metric for the storage system 202a, a current cache hit metric for the storage system 202a, a current read/write percentage metric for the storage system 202a, a current storage object (e.g., a LUN or file system) utilization metric for the storage system 202a, and/or any other storage system performance metric that would be understood by one of skill in the art in possession of the present disclosure as describing the current performance of the storage system 202a.

As also discussed above, the current storage system data received by the denial-of-service detection engine 304 in the denial-of-service detection subsystem 206/300 from the storage system 202a may describe current storage system network metrics for the storage system 202a such as a current iSCSI port bandwidth metric for the storage system 202a, a current iSCSI port requests metric for the storage system 202a, a current fiber channel port bandwidth metric for the storage system 202a, a current fiber channel port requests metric for the storage system 202a, a current fiber channel link errors metric for the storage system 202a, a current Ethernet port bandwidth metric for the storage system 202a, a current Ethernet packets metric for the storage system 202a, and/or any other storage system network metric that would be understood by one of skill in the art in possession of the present disclosure as describing the current utilization of a network by the storage system 202a. However, while a few specific storage system operating metrics are described above, one of skill in the art in possession of the present disclosure will recognize that a wide variety of storage system operating methods may be reported by the storage system 202a to the denial-of-service detection subsystem 206/300 at block 402 while remaining within the scope of the present disclosure as well The method 400 then proceeds to decision block 404 where it is determined whether an operating anomaly is detected in the current storage system data. In an embodiment, at decision block 404, the denial-of-service detection engine 304 in the denial-of-service detection subsystem 206/300 may determine whether an operating anomaly exists in any of the current storage system data received from the storage system 202a at block 402 by, for example, determining whether the current storage system data for any of the storage system operating metrics is anomalous when compared to historical storage system data. One of skill in the art in possession of the present disclosure will recognize how the current storage system data may be compared to the collection of historical storage system data discussed above, and how the analysis of that current storage system data and historical storage system data may be performed to determine whether the current storage system data represents an operating anomaly for the corresponding storage system when compared to the historical storage system data. As such, "operating anomalies" from historical storage system data may be defined in a variety of manners that will fall within the scope of the present disclosure. If, at decision block 404, it is determined that an operating anomaly is not detected in the current storage system data, the method 400 returns to block 402. As such, the method 400 may loop through blocks 402 and 404 to receive current storage system data from the storage systems 202a-202c and, in some embodiments, use that storage system data as historical storage system data for the multi-variate anomaly detection model discussed above when no operating anomaly is detected using that current storage system data.

If at decision block 404, it is determined that an operating anomaly is detected in the current storage system data, the method 400 proceeds to decision block 405 where the denial-of-service detection engine 304 in the denial-of-service detection subsystem 206/300 may determine whether the current storage system data received from the storage system 202a at block 402 for any of the storage system operating metrics exceeds an operating threshold for that storage system operating metric. In some embodiments, the denial-of-service detection engine 304 in the denial-of-service detection subsystem 206/300 may provide operating thresholds for each storage system operating metric that may be reported by a storage system, and one of skill in the art in possession of the present disclosure will recognize how the thresholds may be selected based on the capabilities of the storage system, conditions selected by a network administrator, and/or any other threshold factor that would be apparent to one of skill in the art in possession of the present disclosure.

Using the examples of the storage system operating metrics discussed above, operating thresholds for storage system performance metrics may include a processing system utilization metric above 70%, a latency metric above 70%, a cache hit metric below 30%, a read/write percentage metric of between 30% and 70% read operations, and a storage object utilization metric of 70%. Similarly, operating thresholds for storage system network metrics may include an iSCSI port bandwidth metric of greater than 70%, an iSCSI port requests metric of greater than 70%, a fiber channel port bandwidth metric of greater than 70%, a fiber channel port requests metric of greater than 70%, a fiber channel link errors metric of greater than 70%, an Ethernet port bandwidth metric of greater than 70%, and an Ethernet packets metric of greater than 70%. However, while specific operating thresholds for storage system operating metrics have been described, one of skill in the art in possession of the present disclosure will appreciate how operating thresholds for storage system operating metrics may vary from those described above while remaining within the scope of the present disclosure as well.

Thus, at decision block 405, the denial-of-service detection engine 304 in the denial-of-service detection subsystem 206/300 may compare the current storage system data received from the storage system 202a to the operating thresholds stored in the denial-of-service detection database 306 for each storage system operating metric reported by that current storage system data, and determine whether any of those operating thresholds are being exceeded. As will be appreciated by one of skill in the art in possession of the present disclosure, in some embodiments, the operating anomaly discussed above with reference to decision block 404 may incorporate the operating threshold discussed above with reference to decision block 405 such that "operating anomalies" are detected when current storage system data exceed both expect behavior based on historical storage system data and an operating threshold defined for the corresponding storage system. If, at decision block 405, it is determined that no operating threshold is exceeded by the current storage system data, the method 400 returns to block 402. As such, the method 400 may loop through blocks 402, 404, and 405 to receive current storage system data from the storage systems 202a-202c and, in some embodiments, use that storage system data as historical storage system data for the multi-variate anomaly detection model discussed above when an operating anomaly is detected using that current storage system data, but that current storage system data does not exceed an operating threshold.

If at decision block 405, it is determined that an operating threshold is exceeded in the current storage system data, the method 400 proceeds to decision block 406 where it is determined whether a time-series similarity is identified in a subset of time-series for different storage system operating metrics. In an embodiment, at decision block 406 and in response to detecting an operating anomaly using the current storage system data received from the storage system 202a, the denial-of-service detection engine 304 in the denial-of-service detection subsystem 206/300 may operate to analyze a respective time-series of the current storage system operating data for any current storage system operating data that is associated with an operating anomaly detected at decision block 404. For example, for current storage system data that was detected as exceeding operating thresholds for its corresponding storage system operating metric, the denial-of-service detection engine 304 in the denial-of-service detection subsystem 206/300 may create a respective time-series using the current storage system data provided for each of those storage system operating metrics, and then perform a time-series similarity identification algorithm in order to determine whether a time-series similarity exists in those respective time-series of current storage system data.

Thus, continuing with the specific examples of the operating thresholds for storage system performance metrics discussed above, a time-series may be generated for the current storage system data for the processing system utilization metric if that current storage system data indicates a processing system utilization above 70%, a time-series may be generated for the current storage system data for the latency metric if that current storage system data indicates a latency above 70%, a time-series may be generated for the current storage system data for the cache hit metric if that current storage system data indicates a cache hit level below 30%, a time-series may be generated for the current storage system data for the read/write percentage metric if that current storage system data indicates read operations outside of 30%-70%, and a time-series may be generated for the current storage system data for the storage object utilization metric if that current storage system data indicates a storage object utilization of greater than 70%.

Similarly, continuing with the specific examples of the operating thresholds for storage system network metrics discussed above, a time-series may be generated for the current storage system data for the iSCSI port bandwidth metric if the current storage system data indicates an iSCSI port bandwidth utilization of greater than 70%, a time-series may be generated for the current storage system data for the iSCSI port requests metric if the current storage system data indicates iSCSI port requests greater than 70%, a time-series may be generated for the current storage system data for the fiber channel port bandwidth metric if the current storage system data indicates a fiber channel port bandwidth utilization of greater than 70%, a time-series may be generated for the current storage system data for the fiber channel port requests metric if the current storage system data indicates fiber channel pot requests greater than 70%, a time-series may be generated for the current storage system data for the fiber channel link errors metric if the current storage system data indicates fiber channel link errors greater than 70%, a time-series may be generated for the current storage system data for the Ethernet port bandwidth metric if the current storage system data indicates an Ethernet port bandwidth utilization greater than 70%, and a time-series may be generated for the current storage system data for the Ethernet packets metric if the current storage system data indicates that the number of Ethernet packets received is 70% greater (or higher) than a typical number of Ethernet packets received during a similar time period.

Figure 6B:
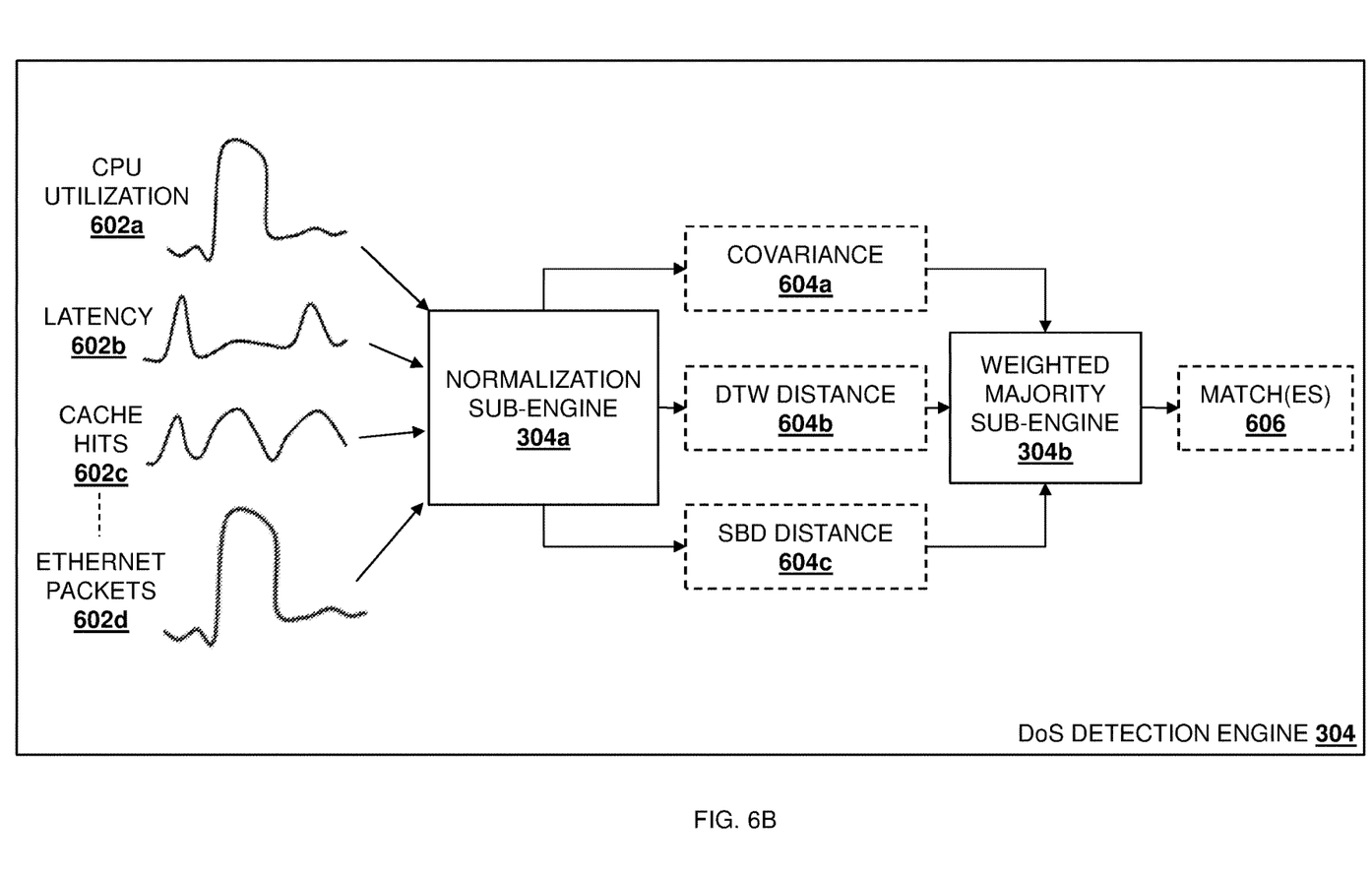
FIG. 6B is a schematic view illustrating an embodiment of the denial-of-service detection system of FIG. 3 operating during the method of FIG. 4.

With reference to FIG. 6B, an embodiment of decision block 406 is illustrated in which the denial-of-service detection engine 304 in the denial-of-service detection subsystem 206/300 has detected operating anomalies in current storage system data received for a CPU utilization metric, a latency metric, a cache hit metric, and an Ethernet packets metric (and possibly other storage system operating metrics discussed above) and, in response, has generated a CPU utilization time-series 602a, a latency time-series 602b, a cache hits time-series 602c, and an Ethernet packets time-series 602d (and possibly respective time-series using the current storage system data for any other storage system operating metric that has exceeded a corresponding operating threshold). One of the inventors of the present disclosure describes techniques for detecting similarities between time-series that may be utilized by the denial-of-service detection subsystem 206/300 in U.S. patent application Ser. No. 16/659,844, filed on Oct. 22, 2019, the disclosure of which is incorporated herein by reference in its entirety.

For example, as can be seen in the embodiment illustrated in FIG. 6B, each of the time-series 602a-602d may be provided to a normalization sub-engine 304a in the denial-of-service detection engine 304, and the normalization sub-engine 304a may operate at decision block 406 to perform normalization operations (e.g., Z-score normalization operations and/or other normalization operations known in the art) on each of the time-series 602a-602d in order to normalize the time-series 602a-602d in a manner that allows the denial-of-service detection engine 304 to determine a covariance 604a for the time-series 602a-602d, a Dynamic Time Warping (DTW) distance 604b for the time-series 602a-602d, a Shape-Based Distance (SBD) distance 604c for the time-series 602a-602d, as described in U.S. patent application Ser. No. 16/659,844 discussed above, as well as any other time-series comparisons that would be apparent to one of skill in the art in possession of the present disclosure.

At decision block 406, the denial-of-service detection engine 304 in the denial-of-service detection subsystem 206/300 may then provide the covariance 604a, the DTW distance 604b, the SBD distance 604c (and/or other time-series comparisons) determined for the time-series 602a-602d to a weighted majority sub-engine 304b in the denial-of-service detection engine 304. The weighted majority sub-engine 304b may then operate to weight the covariance 604a, the DTW distance 604b, and the SBD distance 604c, and compare the weighted time-series curves to determine whether one or more matches 606 exist between the time-series 602a-602d and the corresponding time-series in the multi-variate anomaly detection model stored in the denial-of-service detection database 306.

For example, three hours of time-series data for multiple storage system operating metrics may be collected and provided in the time-series similarity algorithm discussed above, which will operate to determine the covariance, DTW distance, SBD distances, and/or other time-series comparisons, and use those time-series comparisons to produce a weighted score that is used to determine whether a match exists with those three hour time series. As such, the time-series similarity algorithm may operate to compare the shape of any particular time-series to that of a set of other time-series to identify the most "similar" matches, with the concept of "similarity" defined as a weighted majority of some number (e.g., three) common similarity measures for the time-series data such as the covariance, DTW distance, and SBD distance discussed above. However, while specific time-series similarity algorithm operations are described above, one of skill in the art in possession of the present disclosure will recognize that similarities between time series of anomalous storage system data may be identified in a variety of manners that will fall within the scope of the present disclosure as well.

In some embodiments, at decision block 406, the denial-of-service detection engine 304 in the denial-of-service detection subsystem 206/300 may then identify a time-series similarity if a subset of the time-series for the current storage system data provided for the different storage system operating metrics are included in the matches 606 detected at decision block 406. For example, the denial-of-service detection engine 304 may require at least three matches of time-series for the current storage system data provided for the different storage system operating metrics in order to determine that a time-series similarity exists at decision block 406. However, while a specific number of matches in time-series for current storage system data provided for the different storage system operating metrics is described, one of skill in the art in possession of the present disclosure will recognize that different subsets of time-series matches (e.g., matches for all of the time-series for current storage system data that included an operating anomaly, a match for a single time-series for current storage system data that included an operating anomaly, etc.) will fall within the scope of the present disclosure as well.

Furthermore, at decision block 406, the denial-of-service detection engine 304 in the denial-of-service detection subsystem 206/300 may identify a time-series similarity if the subset of the time-series for the current storage system data provided for the different storage system operating metrics that are included in the matches 606 detected at decision block 406 include at least one storage system performance metric and at least one storage system network metric. For example, the denial-of-service detection engine 304 may require at least two matches of time-series for the current storage system data provided for the different storage system operating metrics, with at least one storage system performance metric (e.g., CPU utilization) and at least one storage system network metric (e.g., Ethernet packets) providing a time-series anomaly match in order to determine that a time-series similarity exists at decision block 406. However, while specific storage system operating metrics required for a time-series similarity are described, one of skill in the art in possession of the present disclosure will recognize that different storage system operating metrics may be required to produce a time-series similarity while remaining within the scope of the present disclosure as well.

If, at decision block 406, it is determined that a time-series similarity is not identified in a subset of time-series for different storage system operating metrics, the method 400 returns to block 402. As such, the method 400 may loop through blocks 402, 404, and 406 to receive current storage system data from the storage systems 202a-202c and, in some embodiments, use that storage system data as historical storage system data for the multi-variate anomaly detection model discussed above when any operating anomaly that is detected using that current storage system data that exceeds operating threshold but that does not result in a time-series similarity being identified.

If at decision block 406, it is determined that a time-series similarity is identified in a subset of time-series for different storage system operating metrics, the method 400 proceeds to block 408 where the denial-of-service detection subsystem performs a denial-of-service remediation action. In an embodiment at block 408 and in response to identifying the time-series similarity, the denial-of-service detection engine 304 in the denial-of-service detection subsystem 206/300 may operate to perform one or more denial-of-service remediation actions. For example, with reference to FIG. 6C, the denial-of-service detection subsystem 206/300 may perform denial-of-service remediation operations 606 that may include the denial-of-service detection engine 304 in the denial-of-service detection subsystem 206/300 identifying the storage system 202a as experiencing the denial-of-service situation, and transmitting an instruction via the network 204 to the storage system 202a that causes a storage device, virtual machine, and/or other source of the denial-of-service situation (i.e., a host subsystem that be being utilized to generate data traffic as part of a denial-of-service attack) to be disabled and/or otherwise cut off from the storage system 202a in a manner that ends the denial-of-service situation.

Figure 6C:
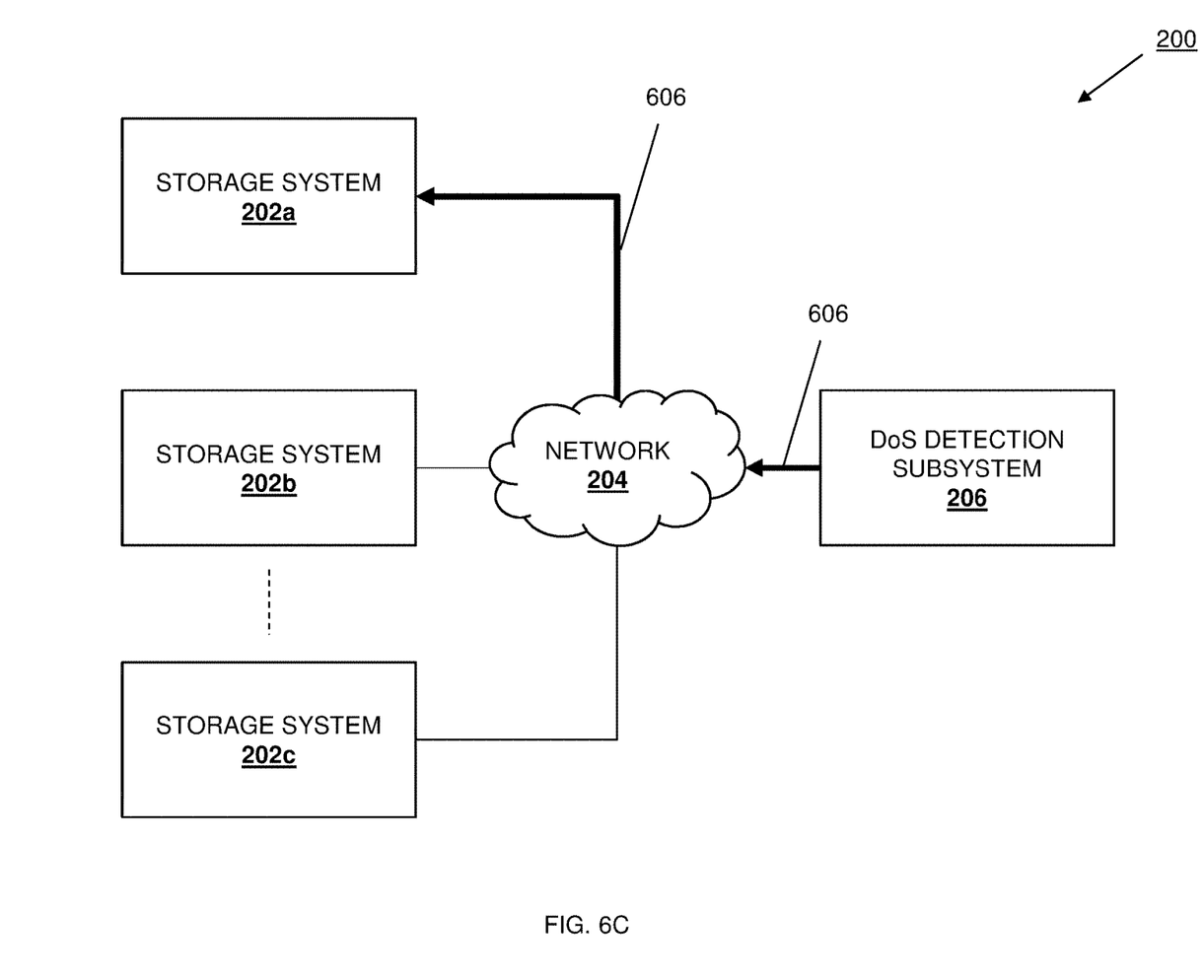
FIG. 6C is a schematic view illustrating an embodiment of the networked system of FIG. 2 operating during the method of FIG. 4.

As will be appreciated by one of skill in the art in possession of the present disclosure, denial-of-service situations such as denial-of-service attacks are relatively rare in occurrence, and thus may be associated with a relatively high number of "false positives" with regard to the detection of those denial-of-service situations. As such, human mitigation may be initiated as part of the denial-of-service remediation operations performed at block 408 by, for example, flagging a detected denial-of-service situation for human investigation and validation, and generating an alert (e.g., as part of the denial-of-service remediation operations 606) in response to such validation and/or confirmation of the occurrence of the denial-of-service situation before modifying the operation of a storage system experiencing that denial-of-service situation Thus, systems and methods have been described that provide a novel approach to the detection of denial-of-service attacks in storage systems via the use of machine leaning algorithm(s) to create of a multi-variate anomaly detection model from historical storage system data that is received from a plurality of storage system, with the multi-variate anomaly detection model used to detect an operating anomaly in current storage system data received from a storage system. In response to the detection of an operating anomaly in such current storage system data, respective time-series of the current storage system data for different operating metrics are analyzed to determine whether a time-series similarity exists for those time-series and, if so, a denial-of-service remediation action is performed. As such, the denial-of-service detection system of the present disclosure may detect operating anomalies in multiple storage system/storage object metrics and, if the time-series for those anomalous storage system/storage object metrics is similar to the time-series of those storage system/storage object metrics during a denial-of-service attack, a denial-of-service attack is identified and a denial-of-service remediation action may be performed.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A denial-of-service detection system, comprising:
a plurality of storage systems; and
a denial-of-service detection subsystem that is coupled to the plurality of storage systems via a network, wherein the denial-of-service detection subsystem is configured to:
  receive, from a first storage system that is included in the plurality of storage systems, current first storage system data for each of a plurality of different storage system operating metrics;
  detect, based on a historical storage system data for each of the plurality of different storage system operating metrics that was previously received from the plurality of storage devices, an operating anomaly in the current first storage system data for at least one of the plurality of different storage system operating metrics;
  generate, in response to detecting the operating anomaly in the current first storage system data, a respective time-series of the current first storage system data for each of the plurality of different storage system operating metrics for which the operating anomaly was detected;
  determine a plurality of time-series comparisons for each of the respective time-series;
  weight each of the plurality of time-series comparisons for each of the respective time-series to provide respective weighted time-series;
  compare a respective shape of each of the respective time series to a corresponding anomaly detection time-series included in an anomaly detection model by comparing each respective weighted time-series to the corresponding anomaly detection time-series included in the anomaly detection model;
  identify, based on the comparison of the respective shape of each of the respective time series to the corresponding anomaly detection time-series included in the anomaly detection model, a time-series similarity between each of a subset of the respective time-series and the corresponding anomaly detection time-series for that respective time-series; and
  perform, in response to identifying the time-series similarity between each of the subset of the respective time-series and the corresponding anomaly detection time-series for that respective time-series, a denial-of-service remediation action.

2. The system of claim 1, wherein the denial-of-service detection subsystem is configured to:
  receive, from each of the plurality of storage systems prior to receiving the current first storage system data from the first storage system, the historical storage system data for each of the plurality of different storage system operating metrics; and generate, using the historical storage system data, the anomaly detection model.

3. The system of claim 2, wherein the anomaly detection model is generated using a machine-learning algorithm that is included in the denial-of-service detection subsystem.

4. The system of claim 1, wherein the identifying the time-series similarity between each of the subset of respective time-series and the corresponding anomaly detection time-series for that respective time-series includes:
identifying at least one first storage system performance time-series similarity; and
identifying at least one first storage system network time-series similarity.

5. The system of claim 1, wherein the plurality of different storage system operating metrics include at least one storage system performance metric and at least one storage system network metric.

6. The system of claim 1, wherein the detecting the operating anomaly in the current first storage system data for the at least one of the plurality of different storage system operating metrics includes:
detecting the operating anomaly in the current first storage system data for each of the plurality of different storage system operating metrics.

7. An Information Handling System (IHS), comprising:
a processing system; and
a memory system that is coupled to the processing system and that includes instructions that, when executed by the processing system, cause the processing system to provide a denial-of-service detection engine that is configured to:
receive, from a first storage system that is included in a plurality of storage systems, current first storage system data for each of a plurality of different storage system operating metrics;
detect, based on a historical storage system data for each of the plurality of different storage system operating metrics that was previously received from the plurality of storage devices, an operating anomaly in the current first storage system data for at least one of the plurality of different storage system operating metrics;
generate, in response to detecting the operating anomaly in the current first storage system data, a respective time-series of the current first storage system data for each of the plurality of different storage system operating metrics for which the operating anomaly was detected;
determine a plurality of time-series comparisons for each of the respective time-series;
weight each of the plurality of time-series comparisons for each of the respective time-series to provide respective weighted time-series;
compare a respective shape of each of the respective time series to a corresponding anomaly detection time-series included in an anomaly detection model by comparing each respective weighted time-series to the corresponding anomaly detection time-series included in the anomaly detection model;
identify, based on the comparison of the respective shape of each of the respective time series to the corresponding anomaly detection time-series included in the anomaly detection model, a time-series similarity between each of a subset of the respective time-series and the corresponding anomaly detection time-series for that respective time-series; and
perform, in response to identifying the time-series similarity between each of the subset of the respective time-series and the corresponding anomaly detection time-series for that respective time-series, a denial-of-service remediation action.

8. The IHS of claim 7, wherein the denial-of-service detection engine is configured to:
receive, from each of the plurality of storage systems prior to receiving the current first storage system data from the first storage system, the historical storage system data for each of the plurality of different storage system operating metrics; and
generate, using the historical storage system data, the anomaly detection model.

9. The IHS of claim 8, wherein the anomaly detection model is generated using a machine-learning algorithm that is included in the denial-of-service detection engine.

10. The IHS of claim 7, wherein the identifying the time-series similarity between each of the subset of respective time-series and the corresponding anomaly detection time-series for that respective time-series includes:
identifying at least one first storage system performance time-series similarity; and
identifying at least one first storage system network time-series similarity.

11. The IHS of claim 7, wherein the plurality of different storage system operating metrics include at least one storage system performance metric and at least one storage system network metric.

12. The IHS of claim 7, wherein the respective time-series of the current first storage system data for each of the plurality of different storage system operating metrics includes a covariance for the time-series, a Dynamic Time Warping (DTW) distance for the time-series, and a Shape-Based Distance (SBD) distance for the time series.

13. The IHS of claim 7, wherein the detecting the operating anomaly in the current first storage system data for the at least one of the plurality of different storage system operating metrics includes:
detecting the operating anomaly in the current first storage system data for each of the plurality of different storage system operating metrics.

14. A method for detecting denial-of-service situations, comprising:
receiving, by a denial-of-service subsystem from a first storage system that is included in a plurality of storage systems, current first storage system data for each of a plurality of different storage system operating metrics;
detecting, by the denial-of-service subsystem based on a historical storage system data for each of the plurality of different storage system operating metrics that was previously received from the plurality of storage devices, an operating anomaly in the current first storage system data for at least one of the plurality of different storage system operating metrics;
generating, by the denial-of-service subsystem in response to detecting the operating anomaly in the current first storage system data, a respective time-series of the current first storage system data for each of the plurality of different storage system operating metrics for which the operating anomaly was detected;
determining, by the denial-of-service subsystem, a plurality of time-series comparisons for each of the respective time-series;

weighting, by the denial-of-service subsystem, each of the plurality of time-series comparisons for each of the respective time-series to provide respective weighted time-series;

comparing, by the denial-of-service subsystem, a respective shape of each of the respective time series to a corresponding anomaly detection time-series included in an anomaly detection model by comparing each respective weighted time-series to the corresponding anomaly detection time-series included in the anomaly detection model;

identifying, by the denial-of-service subsystem based on the comparison of the respective shape of each of the respective time series to the corresponding anomaly detection time-series included in the anomaly detection model, a time-series similarity between each of a subset of the respective time-series and the corresponding anomaly detection time-series for that respective time-series; and performing, by the denial-of-service subsystem in response to identifying the time-series similarity between each of the subset of the respective time-series and the corresponding anomaly detection time-series for that respective time-series, a denial-of-service remediation action.

15. The method of claim 14, further comprising:

receiving, by the denial-of-service subsystem from each of the plurality of storage systems prior to receiving the current first storage system data from the first storage system, the historical storage system data for each of the plurality of different storage system operating metrics; and generating, by the denial-of-service subsystem using the historical storage system data, the anomaly detection model.

16. The method of claim 15, wherein the anomaly detection model is generated using a machine-learning algorithm that is included in the denial-of-service detection engine.

17. The method of claim 14, wherein the identifying the time-series similarity between each of the subset of respective time-series and the corresponding anomaly detection time-series for that respective time-series includes:

identifying at least one first storage system performance time-series similarity; and identifying at least one first storage system network time-series similarity.

18. The method of claim 14, wherein the plurality of different storage system operating metrics include at least one storage system performance metric and at least one storage system network metric.

19. The method of claim 14, wherein the respective time-series of the current first storage system data for each of the plurality of different storage system operating metrics includes a covariance for the time-series, a Dynamic Time Warping (DTW) distance for the time-series, and a Shape-Based Distance (SBD) distance for the time series.

20. The method of claim 14, wherein the detecting the operating anomaly in the current first storage system data for the at least one of the plurality of different storage system operating metrics includes:

detecting the operating anomaly in the current first storage system data for each of the plurality of different storage system operating metrics.

* * * * *